United States Patent [19]

Bücher et al.

[11] Patent Number: 5,406,571
[45] Date of Patent: Apr. 11, 1995

[54] OPTICAL DECOUPLING ARRANGEMENT FOR LASER BEAM

[75] Inventors: Hermann Bücher, Aachen; Harald Kneipp, Berlin; Uwe Stamm, Göttingen, all of Germany

[73] Assignee: Lambda Gesellschaft zur Herstellung von Lasern mbH, Göttingen, Germany

[21] Appl. No.: 182,593

[22] Filed: Jan. 18, 1994

[30] Foreign Application Priority Data

Jan. 18, 1993 [DE] Germany ............ 43 02 378.9

[51] Int. Cl.6 .............. H01S 3/106; H01S 3/081
[52] U.S. Cl. .............. 372/20; 372/32; 372/99; 372/100; 372/102
[58] Field of Search ............ 372/9, 32, 19, 20, 99, 372/100, 102, 107, 108

[56] References Cited

U.S. PATENT DOCUMENTS

| | | | |
|---|---|---|---|
| 3,739,295 | 6/1973 | Shah | 372/100 X |
| 4,127,828 | 11/1978 | Klauminzer | 372/100 X |
| 4,399,540 | 8/1983 | Bucher | 372/20 |
| 4,972,429 | 11/1990 | Herbst | 372/100 |
| 5,226,050 | 7/1993 | Burghardt | 372/20 |

FOREIGN PATENT DOCUMENTS 2918863 7/1981 Germany.
228117A1 10/1985 Germany.
4002162 4/1991 Germany.

OTHER PUBLICATIONS

R. Konig, S. Mory and A. Rosenfeld, "Small Line Width Nanosecond Dye Laser of High Spectrual Purity With Double Functional Grating", J. Phys. E:Sci. Instrum. pp. 200–203, 1987.

Ulrich Krackhardt, Joseph N. Malt, and Norbert Streibl, "Upper Bound on the Diffraction Efficiency of Phase-Only Fanout Elements", Applied Optics. vol. 31, No. 1, pp. 27–37, Jan. 1, 1992.

Primary Examiner—Rodney B. Bovernick
Assistant Examiner—Hemang Sanghari
Attorney, Agent, or Firm—Brumbaugh, Graves, Donohue & Raymond

[57] ABSTRACT

A tunable laser oscillator, comprises a laser medium, an optical resonator, a wavelength selective element for adjusting the wavelength of a laser beam, and optical means for broadening the radiation in the resonator. The laser beam is decoupled from the resonator by means of an optical element after having passed the broadening means and prior to passing again through the laser medium. The laser beam is decoupled from the resonator such that its direction is independent of the beam wavelength.

6 Claims, 4 Drawing Sheets

OPTICAL DECOUPLING ARRANGEMENT FOR LASER BEAM

FIELD OF THE INVENTION

The instant invention relates to a tunable laser oscillator, comprising a laser medium, an optical resonator, a wavelength selective element for adjusting the wavelength of a beam emited by the laser oscillator, and a means for broadening the radiation in the resonator, the beam emitted by the laser oscillator, after having passed the broadening means and prior to passing again through the laser medium, being decoupled from the resonator by means of an optical element.

BACKGROUND OF THE INVENTION

A laser oscillator of the kind recited above is known from DE 40 02 162 C1, comprising a laser medium which emits radiation of such broad band that the laser oscillator is tunable, i.e. capable of being varied or adjusted by means of a wavelength selective element.

The fundamental structure of tunable laser oscillators comprising a beam broadening means is known, for instance, from DE 29 18 863 C2. These laser oscillators contain a laser medium emitting broadband radiation, for example a dye solution, excimers produced by gas discharge, or solid body materials. A dispersive element is disposed inside the resonator for tuning of the wavelength. This tuning element (wavelength selective element), for instance, may be in the form of a grating or a dispersing prism assembly. Other suitable wavelength selective elements are an etalon, a Fabry-Perot interferometer, or birefringent crystals.

DD 228 117 A1 discloses a resonator arrangement for a tunable laser, comprising a single reflecting structural member of such design that it produces good spectral filtering at high wavelength selectivity and narrowbandedness. Continuous tuning of the wavelength is achieved by pressure variation. The laser beam is broadened by a system of prisms.

A paper by R. König, S. Mory, and A. Rosenfeld published in J. Phys. E.: Sci. Instrum. 20 (1987), at pages 200 to 203, describes a pulsed dye laser with which the beam is widened in the resonator by means of prisms and the wavelength is tuned by rotation of a grating and/or an FP etalon.

A narrowband, tunable laser which comprises a means for decoupling of a reference beam from the laser resonator, including two wavelength selective elements for narrowband tuning of the laser, is described in DE 40 02 162 C1 mentioned initially. The direction of the reference beam depends on the wavelength, and a change in direction of the reference beam is utilized to derive a control signal for control of the angular orientation of a wavelength selective element of the laser. The direction of another partial beam likewise is dependent on the wavelength.

The decoupled laser radiation of the arrangement according to DE 29 18 863 C2 contains both narrowband radiation whose spectral distribution essentially is determined by the beam broadening device and the wavelength selective element as well as relatively broadband radiation whose spectral distribution essentially is determined by the broadband emitting laser medium. This broadband spontaneous radiation is referred to as ASE, for Amplified Spontaneous Emission. The ratio between the energy of the narrowband laser radiation and the energy of the ASE is called the spectral purity of the output radiation of the laser oscillator. The spectral purity of the output radiation of the laser deteriorates, for example, if the laser medium is stimulated in pulsating fashion and the period of the stimulating pulses is of the same order of magnitude as the roundtrip time of the light inside the laser resonator.

The spectral purity of laser radiation also suffers, for example, if the output radiation is intensified further as soon as the ASE and the spectrally pure laser light (in other words the relatively narrowband radiation mentioned above) take different courses in time inside the laser. In general, the ASE is emitted prior to the laser radiation.

SUMMARY OF THE INVENTION

It is the object of the invention to improve a laser oscillator of the kind specified initially in such a way that an output beam of great spectral purity will be obtained at little structural expenditure. The direction of this output beam is to be independent of the wavelength and independent of the position of the wavelength selective element of the resonator.

A laser oscillator as provided by the instant invention, comprising but one wavelength selective element (i.e. no other tuning members), emits radiation of great spectral purity and also makes it possible to suppress feedback from downstream amplifier stages. Moreover, such a laser oscillator permits extremely short pumping pulses to be applied where pulsed operation is desired, such as with a dye laser. The pumping pulses (stimulating pulses) can be as brief as the roundtrip of the radiation takes inside the laser resonator, or even shorter.

Thus it is essential to the invention that
(a) the laser radiation is decoupled on the way from the wavelength selective element to the laser medium (rather than the other way around) prior to passing once again through the laser medium where broadband radiation (fluorescence and ASE) can be superimposed once more over the laser radiation which now is narrowband radiation,
(b) this decoupling preferably is accomplished at an element of the optical structure which is needed anyway, and
(c) the decoupling is achieved by refraction or reflection at partly or totally mirrored faces.

The optical element for decoupling of the beam preferably forms part of the means which serves to broaden the intra-resonator radiation. If the optical element for decoupling of the beam is part of the device for broadening of the beam in the resonator no additional element, which would involve optical loss, is required to decouple the beam after it has passed the wavelength selective element and before it passes through the laser medium.

If spectral filtering downstream of the laser resonator is applied in the context of the assembly group used for adjustment of the wavelength, optical components, such as a set of mirrors or prisms are required to return the decoupled radiation. In a preferred embodiment of the invention, therefore, it is provided that part of a filter means for spectral filtering of the radiation, at the same time, serves for tuning and adjusting the wavelength.

The wavelength independence of the direction of the decoupled beam can be obtained, according to a preferred embodiment of the invention, in that the beam broadening means is achromatic at the decoupling location.

Thus the optical element for decoupling of the beam, for instance, may be a prism in which the radiation is totally reflected at least once before it exits from the prism.

Another possibility of decoupling the beam from the resonator would be to use an optical element which is polarization selective to accomplish the decoupling.

In a preferred modification, the optical element according to the invention for decoupling of the beam from the resonator is characterized in that it includes at least one face which is totally or partly mirrored.

BRIEF DESCRIPTION OF THE DRAWINGS

The invention will be explained in greater detail below with reference to diagrammatic drawings, in which.

DESCRIPTION OF THE PREFERRED EMBODIMENTS

Figure 1:
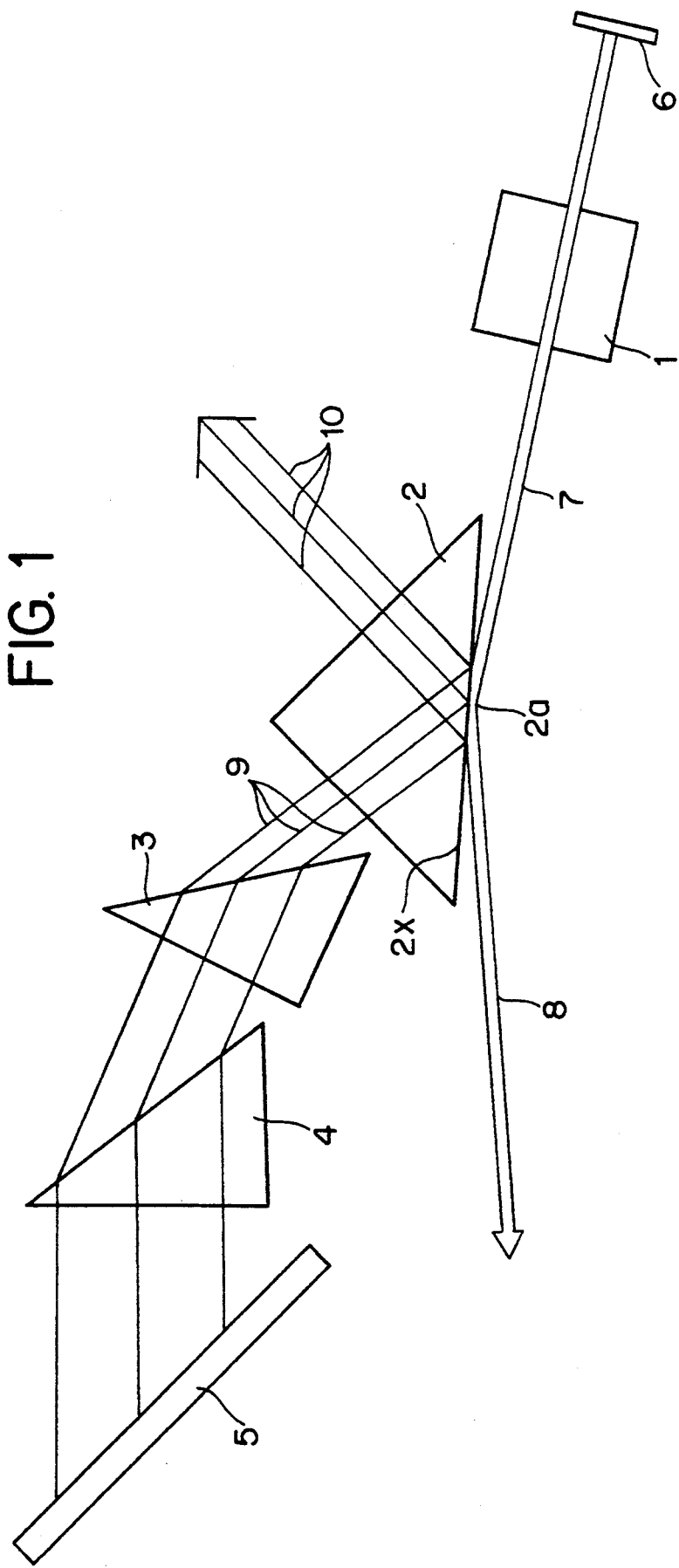
FIG. 1 is a presentation of a tunable laser oscillator.

FIG. 1 shows a laser oscillator comprising a laser medium 1 and means 2, 3, 4 for broadening the radiation. The resonator of the laser is embodied by a grating 5 and an oscillator mirror 6. The laser medium 1 may be the dye cuvette of a dye laser, for example.

Radiation 7 from the oscillator mirror 6 and from the laser medium 1 is reflected in part (beam 8 which is of no particular interest here) at a point 2a on the bottom face 2x of the prism 2 which forms part of the beam broadening means, and in part it is refracted into the prism 2. This radiation is widened or broadened. From prism 2 it reaches a prism 3, the radiation leaving the prism 2 being marked by reference numeral 9. Prisms 3 and 4 cause further broadening of the radiation before it reaches the wavelength selective grating 5 which reflects it. The radiation reflected by grating 5 is returned along the same path back towards the face 2x of prism 2 where a partial reflection takes place without the reflected radiation getting to the laser medium 1. In FIG. 1 the radiation reflected at face 2x of prism 2 is marked by reference numeral 10, and this is the laser beam which has been decoupled.

With the arrangement of the laser oscillator and the prism 2 with its face 2x for decoupling of the laser beam 10 illustrated in FIG. 1 the direction of the decoupled laser beam 10 still is dependent on the wavelength (cf. also DE 40 02 162 C1).

Figure 2:
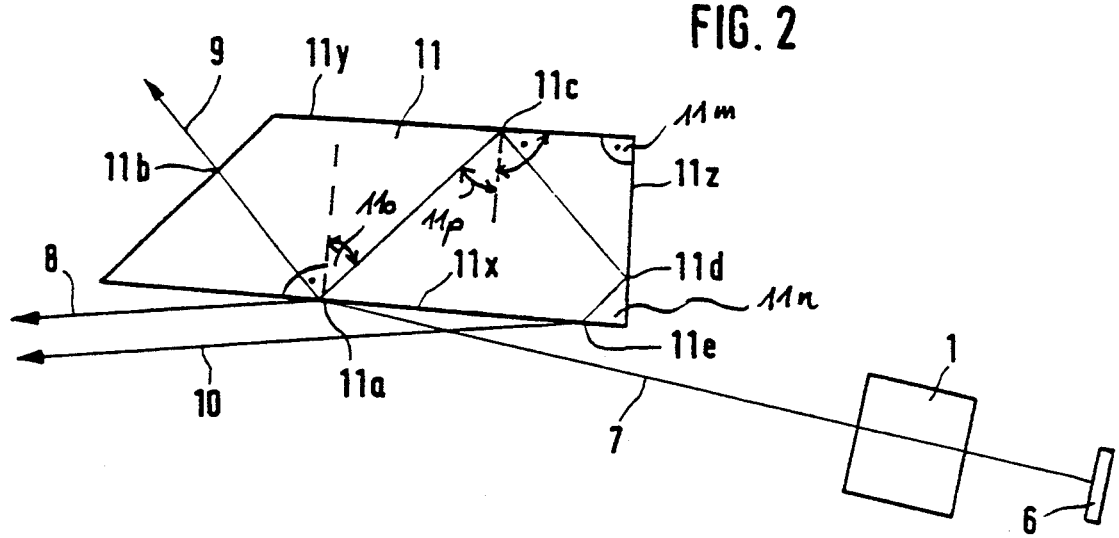
FIG. 2 shows a modification of the laser oscillator illustrated in FIG. 1, including a structural member which is modified such that the direction of the decoupled beam is independent of the wavelength.

FIG. 2 shows part of a laser oscillator similar to the one illustrated in FIG. 1. Although provided in fact, the prisms 3, 4 and the grating 5 are not shown in the drawing of the embodiment of FIG. 2. Otherwise, corresponding structural members and beams are designated by the same reference numerals. This means that in FIG. 2 the laser beam 9 issuing in upward direction to the left corresponds to beam 9 of FIG. 1, in other words the radiation exiting, as marked by reference numeral 9, passes through prisms corresponding to prisms 3 and 4 of FIG. 1 to reach a grating which corresponds to grating 5 in FIG. 1.

FIG. 2 shows a prism 11 which replaces prism 2 of the embodiment according to FIG. 1. Other than that, FIG. 2 also shows the laser medium 1 and oscillator mirror 6, both in accordance with FIG. 1. As already described with regard to the embodiment presented in FIG. 1, radiation 7 which comes from the oscillator mirror 6 and the laser medium 1 hits a face 11x of the prism 11, whereby a reflected partial beam 8 and a broadened partial beam 9 are formed. The partial beam 9 leaves the prism 11 at a location 11b and, having passed the other deflection elements (prisms, mirrors, etc.) (not shown), it impinges upon grating 5 (not shown) only to be reflected back the same way it arrived. In other words, the reflected radiation reenters the prism 11 at the location 11b and then reaches a location 11a on the face 11x of the prism 11. This radiation consequently moves in the opposite direction to the direction indicated for beam 9 in FIG. 2. The reflected radiation from the grating is reflected at least partly at the location 11a of the face 11x of prism 11, and this reflected radiation impinges at a location 11c on a face 11y of the prism 11. The faces 11x and 11y are planar, parallel faces. The prism 11 thus comprises a plate which has parallel surfaces. At location 11c, the radiation is totally reflected, as illustrated in FIG. 2, and then reaches a location 11d on a face 11z of the prism 11. As may be seen in FIG. 2, face 11z extends at right angles to the faces 11x and 11y of the prism 11. Again, the radiation is totally reflected at location 11d and thereupon reaches a location 11e on the face 11x of the prism 11. Here, the radiation is not reflected altogether but instead refracted due to the refractive indices given and the angles adjusted so that a beam 10 is decoupled from the resonator. The direction of this beam 10 no longer depends upon the wavelength by virtue of the provision and arrangement shown of the prism 11.

Figure 3:
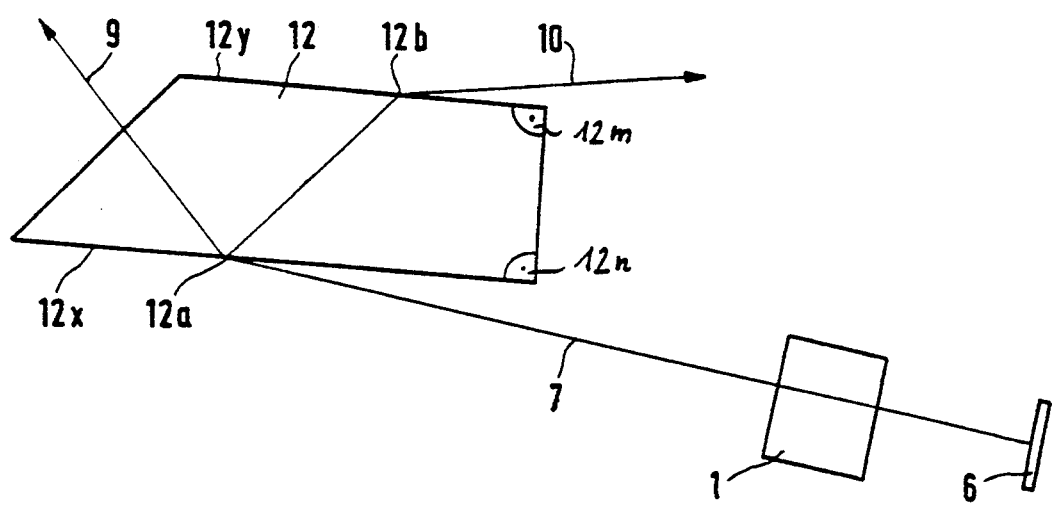
FIG. 3 shows a modification of the embodiment illustrated in FIG. 2.

FIG. 3 illustrates another modification of a laser oscillator as presented in FIG. 1. As in FIG. 2, once again neither the prisms 3 and 4 of the beam broadening means nor the reflecting grating 5 are shown but must be imagined as existing in addition. The embodiment according to FIG. 3 is similar to the one shown in FIG. 1 with the prism 2 replaced by a prism 12. Prism 12 has the effect of making the decoupled laser beam 10 in its direction independent of the wavelength. To accomplish this wavelength independence of the direction of the decoupled laser beam 10, the prism 12 has two parallel faces 12x and 12y.

In analogy to the embodiments described above, radiation 7 coming from the oscillator mirror 6 and/or the laser medium 1 is refracted at a location 12a on face 12x (the reflected partial beam is not shown here) and exits from the prism 12 as indicated by reference numeral 9. As in the case of the embodiments described above, broadened radiation is reflected by a grating (not shown in FIG. 3) and returns in opposite direction back into the prism 12 where it is reflected at the location 12a by virtue of the refractive indices selected and the angles adjusted. From location 12a, the reflected radiation reaches a location 12b on the face 12y of the prism 12 where it is reflected due to the angles adjusted and the refractive indices. This results in a decoupled laser beam 10 whose direction is independent of its wavelength.

As may be taken from FIGS. 2 and 3, according to the invention the input element of the beam broadening means is of such design that the direction of the output beam 10 can be transfered into that of the input beam 7 by mirroring at the entry face (of the input element) or by mirroring at a plane perpendicular to this entry face. In the case of the embodiment shown in FIG. 3 this is achieved by the precise parallel orientation of the faces 12y and 12x. The two angles 12m and 12n presented in FIG. 3 thus are exactly alike, namely 90° each.

In the case of the embodiment according to FIG. 2, the condition of the direction of the output beam 10 being transferable into the direction of the input beam 7 by mirroring at the entry face or a plane perpendicular to the same, is obtained by the provision of mirrored faces 11y and 11z while maintaining the two right angles 12m and 12n (as in FIG. 3). Consequently, an internal total reflection is obtained at these faces.

The embodiment presented in FIG. 2 also can be modified in such a way that the angles 11m and 11n have different sizes. In that event, the face 11y is inclined towards the face 11x, the angles being selected, for example, so that 11m=90°, while 11n=88°. In this context the condition applies that 11m−11n=11o−11p, with the additional condition that 11p >arc sin (p/2 refractive index) for a twofold total reflection at faces 11y and 11z.

Figure 4:
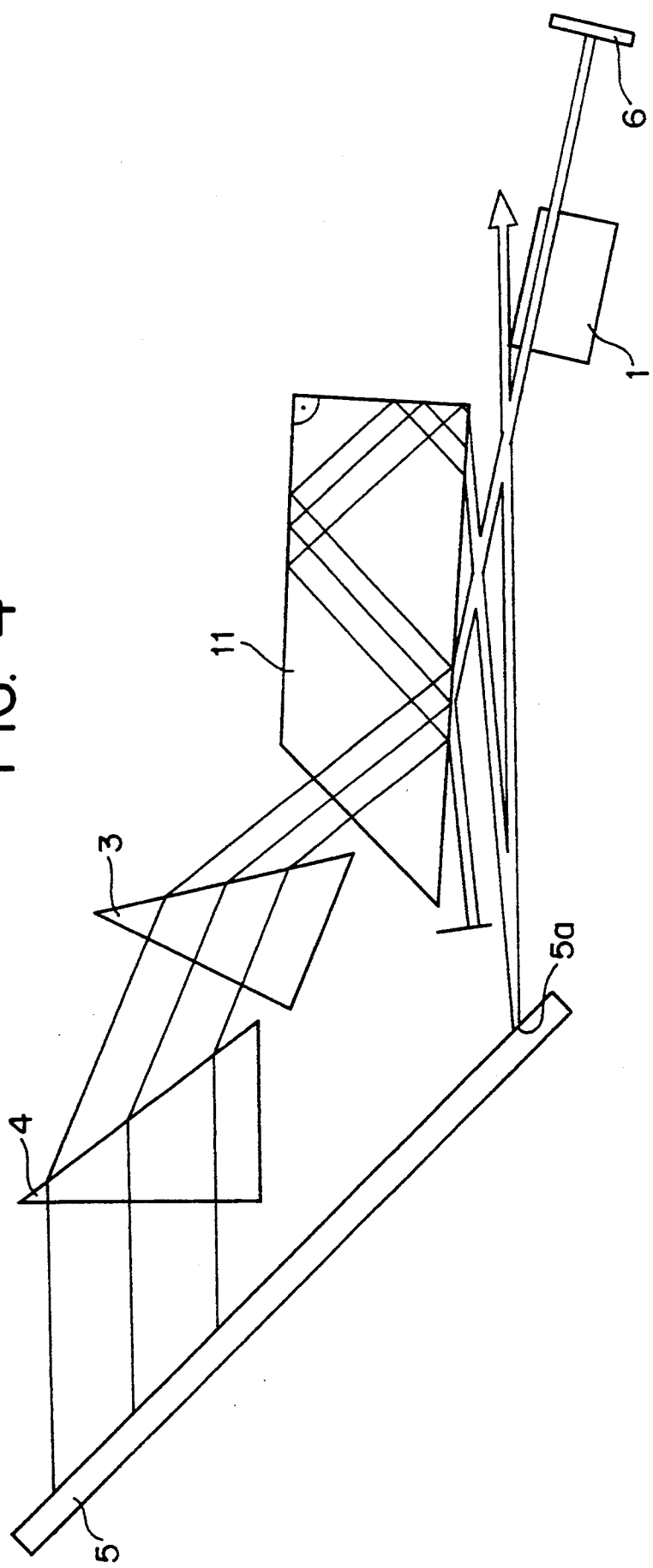
FIG. 4 shows a modification of the embodiment illustrated in FIG. 2, with the wavelength selective element being used once more.

FIG. 4 shows a different beam path as compared to the previous Figures and this beam path can be understood directly by looking at the Figure. The beam guidance in prism 11 takes such a course that the beam exiting from the prism impinges on the grating 5 at a location 5a and is decoupled from that location without passing once again through the laser medium 1. The remainder of the structural members and their functions are clear from the above specification, taking into account the reference numerals indicated.

Figure 5:
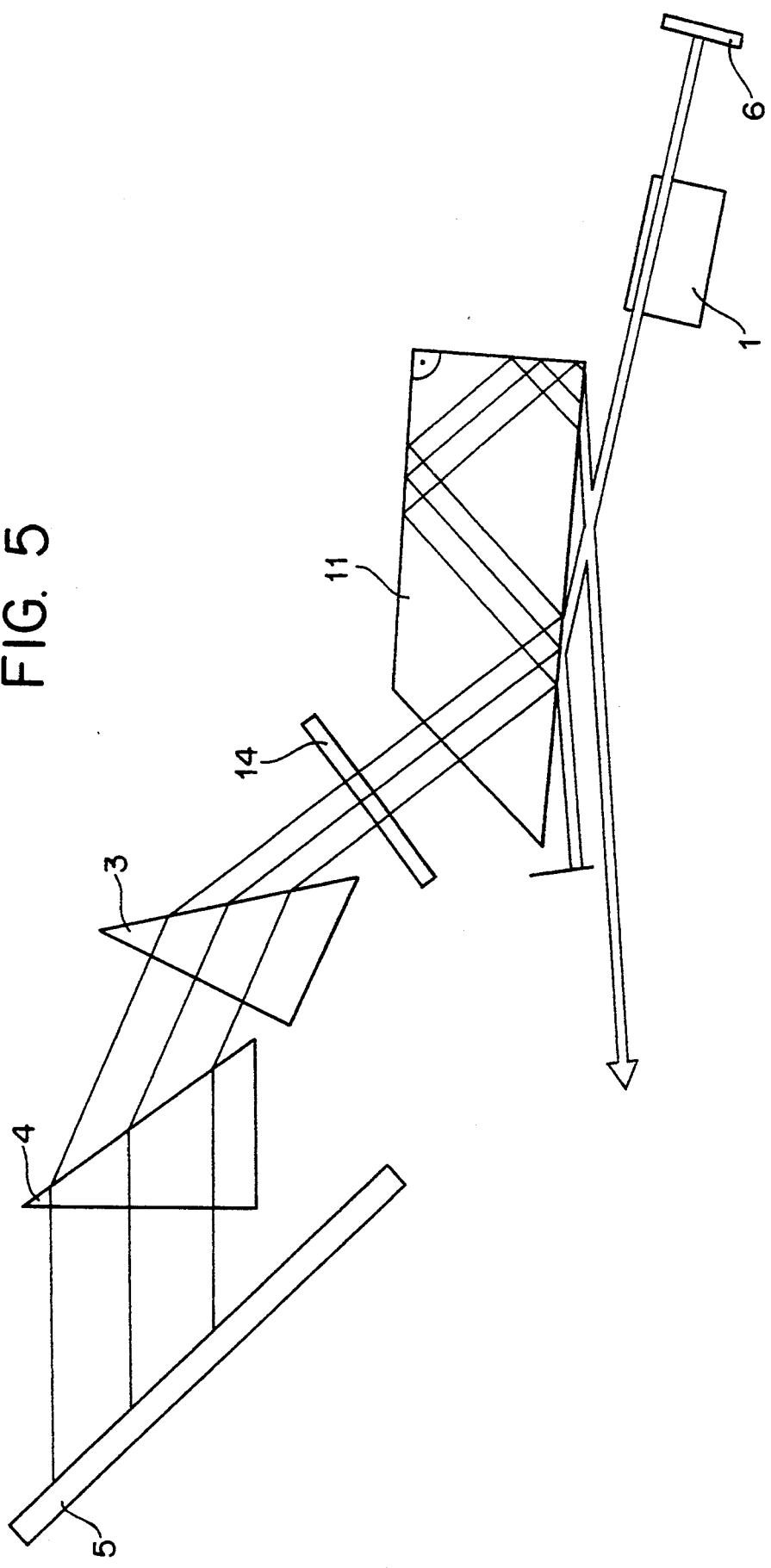
FIG. 5 shows an embodiment in which the polarization properties of light are utilized.

The embodiment according to FIG. 5 includes an additional element as compared to the embodiment shown in FIG. 2, namely a so-called λ/2 plate 14 which makes it possible to utilize the polarization properties of light.

What is claimed is:

1. A tunable laser oscillator, comprising a laser medium, an optical resonator, a wavelength selective element for adjusting the wavelength of a beam emitted by the laser oscillator, and a means for broadening the radiation in the resonator, the beam emitted by the laser oscillator after having passed the broadening means, and prior to passing again through the laser medium, being decoupled from the resonator by means of an optical element, characterized in that the optical element for decoupling of the beam is designed and arranged such that the direction of the decoupled beam is independent of the beam wavelength, wherein the optical element has two flat parallel faces which provide the wavelength independence of the decoupled beam by refraction.

2. The laser oscillator as claimed in claim 1, characterized in that the optical element for decoupling of the beam is embodied by a prism.

3. The laser oscillator as claimed in claim 1, characterized in that the optical element for decoupling of the beam forms part of the means for broadening the intraresonator radiation.

4. The laser oscillator as claimed in claim 1, characterized in that the optical element for decoupling of the beam includes a face at which the radiation is partly reflected and partly refracted.

5. The laser oscillator as claimed in claim 1, characterized in that the optical element for decoupling of the beam is polarization selective.

6. The laser oscillator as claimed in claim 1, characterized in that the optical element for decoupling of the beam includes at least one face which is totally or partly mirrored.

* * * * *